United States Patent
Lim et al.

(10) Patent No.: US 10,334,118 B2
(45) Date of Patent: Jun. 25, 2019

(54) METHOD AND SYSTEM FOR PROVIDING VIDEO MULTIMEDIA RINGTONE

(71) Applicant: Camp Mobile Corporation, Seoul (KR)

(72) Inventors: Seung Phill Lim, Seoul (KR); Jung Guk Kim, Seoul (KR)

(73) Assignee: Camp Mobile Corporation, Seoul (KR)

( * ) Notice: Subject to any disclaimer, the term of this patent is extended or adjusted under 35 U.S.C. 154(b) by 0 days.

(21) Appl. No.: 14/314,937

(22) Filed: Jun. 25, 2014

(65) Prior Publication Data

US 2015/0005041 A1    Jan. 1, 2015

(30) Foreign Application Priority Data

Jun. 26, 2013   (KR) .......................... 10-2013-0073904

(51) Int. Cl.
*H04M 19/04*   (2006.01)
*H04M 3/02*    (2006.01)

(52) U.S. Cl.
CPC ............. *H04M 19/04* (2013.01); *H04M 3/02* (2013.01)

(58) Field of Classification Search
CPC ....... H04W 4/00; H04W 4/206; H04M 19/04; H04M 3/02; H04M 1/72572; H04M 1/72569
See application file for complete search history.

(56) References Cited

U.S. PATENT DOCUMENTS

| | | | | |
|---|---|---|---|---|
| 7,904,067 | B1* | 3/2011 | Tiwari .............. | H04M 3/42153 379/142.04 |
| 8,843,853 | B1* | 9/2014 | Smoak ................. | G06F 3/0482 715/788 |
| 2008/0021957 | A1* | 1/2008 | Medved ................ | G06Q 30/02 709/203 |
| 2009/0170532 | A1* | 7/2009 | Lee .................... | H04M 1/72566 455/456.3 |
| 2009/0209237 | A1* | 8/2009 | Six ....................... | G11B 27/034 455/414.1 |
| 2010/0234076 | A1* | 9/2010 | Park ...................... | G06F 3/0362 455/566 |
| 2012/0071142 | A1* | 3/2012 | Medved ................ | H04M 19/04 455/414.1 |

FOREIGN PATENT DOCUMENTS

| | | |
|---|---|---|
| JP | 2003-18283 | 1/2003 |
| JP | 2006-174044 | 6/2006 |
| KR | 10-2003-0037091 A | 5/2003 |
| KR | 10-2004-0082044 A | 9/2004 |
| KR | 10-0600367 | 6/2005 |
| KR | 10-2008-0012458 A | 2/2008 |

\* cited by examiner

*Primary Examiner* — George Eng
*Assistant Examiner* — Hung K Du
(74) *Attorney, Agent, or Firm* — Greer Burns & Crain, Ltd.

(57) ABSTRACT

A method and system for providing a video multimedia ringtone include setting, by a processor, a silent video separated from a multimedia file, as a media file that is a video file of a ringtone, setting, by the processor, a selected sound source as a bell file that is a sound file of the ringtone, and simultaneously playing back, by the processor, the media file and the bell file that are set as the ringtone, in response to an incoming call signal.

13 Claims, 6 Drawing Sheets

METHOD AND SYSTEM FOR PROVIDING VIDEO MULTIMEDIA RINGTONE

CROSS-REFERENCE TO RELATED APPLICATION

This application claims priority from and the benefit of Korean Patent Application No. 10-2013-0073904, filed on Jun. 26, 2013, which is hereby incorporated by reference for all purposes as if fully set forth herein.

BACKGROUND

Example embodiments relate to a method and system for providing a ringtone of a mobile terminal.

DESCRIPTION OF THE BACKGROUND

In general, a mobile terminal may designate a ringtone as a music file selected by a user. In response to an incoming call, the selected music file may be played back as the ringtone.

Korean Patent No. 10-0600367 titled "Method of sounding bells in mobile communication terminal" discloses a technology that enables a plurality of bells, for example, ringtones to be automatically rotated and be provided at a time in response to an incoming call until a user receives the call.

In the related art, a music file designated as a ringtone is played back in response to an incoming call. Once a user receives the call, the music file being played back is terminated.

However, although a recent mobile terminal is a multimedia device, such as a smartphone and a tablet, for example, only a music file may be used as a ringtone.

Accordingly, proposed is a technology for configuring a ringtone of a mobile terminal using video multimedia.

SUMMARY

Example embodiments provide a ringtone providing method and system for configuring a ringtone using video multimedia.

Example embodiments also provide a ringtone providing method and system that may reduce sound source interference in which an undesired sound source is mixed when configuring a video as a ringtone, or reduce a volume malfunction occurring due to an uncontrollable volume.

Additional features of the example embodiments will be set forth in the description which follows, and in part will be apparent from the description, or may be learned by practice of the example embodiments.

Example embodiments disclose a method of providing a ringtone, the method including setting, by a processor, a silent video separated from a multimedia file, as a media file that is a video file of a ringtone, setting, by the processor, a selected sound source as a bell file that is a sound file of the ringtone, and simultaneously playing back, by the processor, the media file and the bell file that are set as the ringtone, in response to an incoming call signal.

The ringtone providing method may further include separating the multimedia file into a sound source and a video.

The setting of the selected sound source may include setting, as the bell file, a sound source separated from the multimedia file.

The setting of the selected sound source may include setting, as the bell file, a sound source selected separately from the multimedia file.

Simultaneously playing back of the media file and the bell file includes controlling a playback volume level of the bell file in response to an input of a control key signal associated with volume during the playback of the ringtone.

The ringtone providing method may further include simultaneously terminating the media file and the bell file being played back when a user receives a call.

Example embodiments also disclose a method of providing a ringtone, the method including separating, by a processor, a multimedia file into a sound source and a video in response to a request for providing the multimedia file as a ringtone, and providing, by the processor, the video separated from the multimedia file, as a media file that is a video file of the ringtone, and providing the sound source separated from the multimedia file, as a bell file that is a sound file of the ringtone. Here, when playing back the ringtone, the media file and the bell file may be simultaneously played back and terminated.

Example embodiments also disclose a ringtone providing system, including a setter configured to set a silent video separated from a multimedia file, as a media file that is a video file of a ringtone, and to set a selected sound source as a bell file that is a sound file of the ringtone, and a player configured to simultaneously play back the media file and the bell file that are set as the ringtone, in response to an incoming call signal It is to be understood that both the foregoing general description and the following detailed description are explanatory and are intended to provide further explanation of the example embodiments as claimed.

EFFECT OF EXAMPLE EMBODIMENTS

According to example embodiments, it is possible to expand an existing ringtone area limited to a music file to a multimedia bell by employing video multimedia as a ringtone. Accordingly, it is possible to enhance a functional utilization and usage of a mobile phone by additionally applying advantages of a multimedia device to a primary call function of the mobile phone.

Also, according to example embodiments, by separating video multimedia into a sound source and a video and by employing a silent video in which the sound source is removed as a media video for a ringtone, it is possible to effectively reduce sound source interference in which an undesired sound source is mixed when configuring a video as a ringtone, or to reduce a volume malfunction occurring due to an uncontrollable volume.

BRIEF DESCRIPTION OF THE DRAWINGS

The accompanying drawings, which are included to provide a further understanding of the example embodiments and are incorporated in and constitute a part of this specification, illustrate example embodiments, and together with the description serve to explain the principles of the example embodiments.

DETAILED DESCRIPTION OF EXAMPLE EMBODIMENTS

The invention is described more fully hereinafter with reference to the accompanying drawings, in which example embodiments are shown. This invention may, however, be embodied in many different forms and should not be construed as limited to the example embodiments set forth herein. Rather, these example embodiments are provided so that this disclosure is thorough, and will fully convey the scope of the invention to those skilled in the art. In the drawings, the size and relative sizes of layers and areas may be exaggerated for clarity. Like reference numerals in the drawings denote like elements.

Example embodiments will now be described more fully with reference to the accompanying drawings. Example embodiments, may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. In the drawings, the thicknesses of layers and areas are exaggerated for clarity. Like reference numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, areas, layers and/or sections, these elements, components, areas, layers and/or sections should not be limited by these terms. These terms are only used to distinguish one element, component, area, layer or section from another element, component, area, layer or section. Thus, a first element, component, area, layer or section discussed below could be termed a second element, component, area, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, example embodiments will be described with reference to the accompanying drawings.

Example embodiments relate to a technology for configuring a ringtone of a user terminal using video multimedia, which may be applied to all the user terminals having a calling function and a multimedia playback function, such as a smartphone and a smart pad, for example.

Conventionally, to configure a ringtone using video multimedia, a method of playing back video multimedia in a state in which an existing ringtone is processed to be silent may be applied, since video multimedia cannot be switched to a ringtone file. That is, in response to an incoming call, a ringtone and video multimedia may be simultaneously played back. Here, although the existing ringtone is played back together with the video multimedia, the existing ringtone is processed to be silent and thus, a mixed sound does not occur. However, although the existing ringtone is processed to be silent, it is still played back together with the video multimedia and thus, uses a great portion of a memory. In addition, a hardware control key, for example, a volume up (+) button and a volume down (−) button, input while receiving the call is limited to a role of adjusting a ringtone volume and thus, a volume of the video multimedia being played back while receiving the call cannot be adjusted.

Accordingly, proposed is a technology capable of reducing sound source interference in which an undesired sound source is mixed video multimedia, minimizing a memory use amount, and particularly, adjusting the volume of the video multimedia being played back while receiving a call, when configuring a ringtone a) using video multimedia.

According to example embodiments, a video multimedia ringtone may be configured using a method of maintaining an existing ringtone and playing back a silent video.

Figure 1:
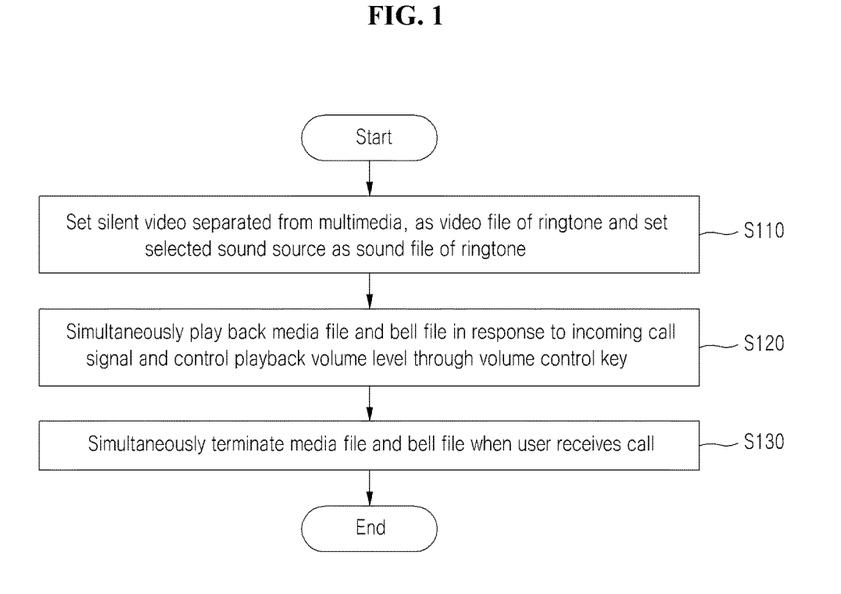
FIG. 1 is a flowchart illustrating a method of providing a ringtone using video multimedia according to an example embodiment.

FIG. 1 is a flowchart illustrating a method of providing a ringtone using video multimedia according to one example embodiment. The ringtone providing method may be performed by a ringtone providing system to be described below. Here, the ringtone providing system is configured on a user terminal that is capable of playing back a ringtone.

In operation S110, the ringtone providing system sets a silent video separated from multimedia, as a video file of a ringtone (hereinafter, referred to as a media file). The ringtone providing system may set a selected sound source as a sound file of the ringtone (hereinafter, referred to as a bell file). Here, the ringtone providing system sets, as the bell file, a sound source separated from the same multimedia applied to the media file, or may set, as the bell file, a sound source selected separately from the multimedia applied to the media file. That is, the bell file may refer to a sound source that is synchronized with the media file, relevant to the media file, or may refer to a sound source irrelevant to the media file.

According to one example embodiment, a video multimedia file is separated into a sound source and a video to be used as a ringtone. The sound source and the video separated from the multimedia file are set as a bell file and a media file, respectively.

As an example, in response to a user request for providing a ringtone with respect to a multimedia file, a server system configured to provide a ringtone related service separates the multimedia file into a sound source and a video and then provides the separated video as a media file of the ringtone and the separated sound source as a bell file of the ringtone. Accordingly, the ringtone providing system stores the sound source and the video separated from the multimedia file, and sets the separated sound source as the bell file and the separated video as the media file, based on a user selection. That is, to configure a ringtone on a user terminal, the set media file and bell file are synchronized. Accordingly, when downloading the multimedia file, the user downloads the silent video, that is, the media file and the bell file synchronized therewith.

As another example, in response to a user request for providing a ringtone with respect to a multimedia file, a server system configured to provide a ringtone related service provides a multimedia file that is separable into a sound source and a video. Accordingly, the ringtone providing system directly separates, into the sound source and the video, the multimedia provide provided from the server system, stores the separated sound source and video, and sets the separated sound source as a bell file and the separated video as a media file, based on a user selection. For example, when downloading a video multimedia file through a service exclusive application installed in a user terminal, the video multimedia file is separated into the sound source and the video and thereby stored in the user terminal and then set as the ringtone.

As another example, the ringtone providing system may load a multimedia file stored in a local area, for example, a photo gallery of a user terminal, separate the multimedia file into a sound source and a video, store the separated sound source and video, and set the separated sound source as a bell file and set the separated video as a media file based on a user selection.

According to example embodiments, a ringtone may be classified into a bell file and a media file and set based on a user selection.

Figure 2:
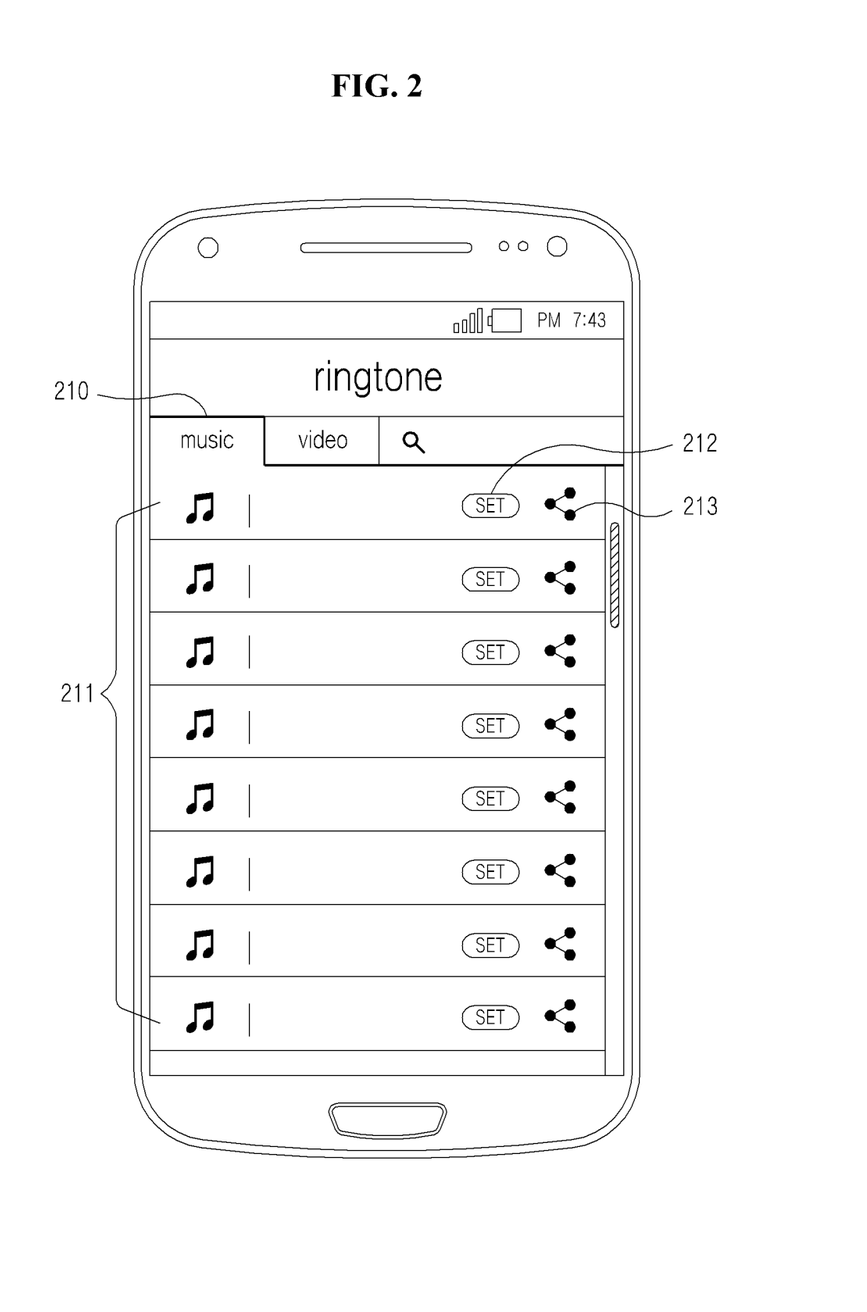
FIGS. 2 through 4 illustrate examples of a service screen for setting a video multimedia ringtone according to example embodiments.

FIG. 2 illustrates an example of a user screen 210 for setting a bell file of a ringtone according to an example embodiment. Referring to FIG. 2, all the sound sources settable as a bell file are displayed as a list 211. The sound sources may include general music files and a sound source separated from a multimedia file. Here, a "set" menu 212 for setting each sound source included in the list 211 as a bell file and a "share" menu 213 for sharing a sound source through a mail service, a messenger service, a social network service, a wireless transmission function, and a memo function may be activated and displayed. Accordingly, a user may select a sound source desired to be set as a bell file of a ringtone using the "set" menu 212 of the user screen 210.

Figure 3:
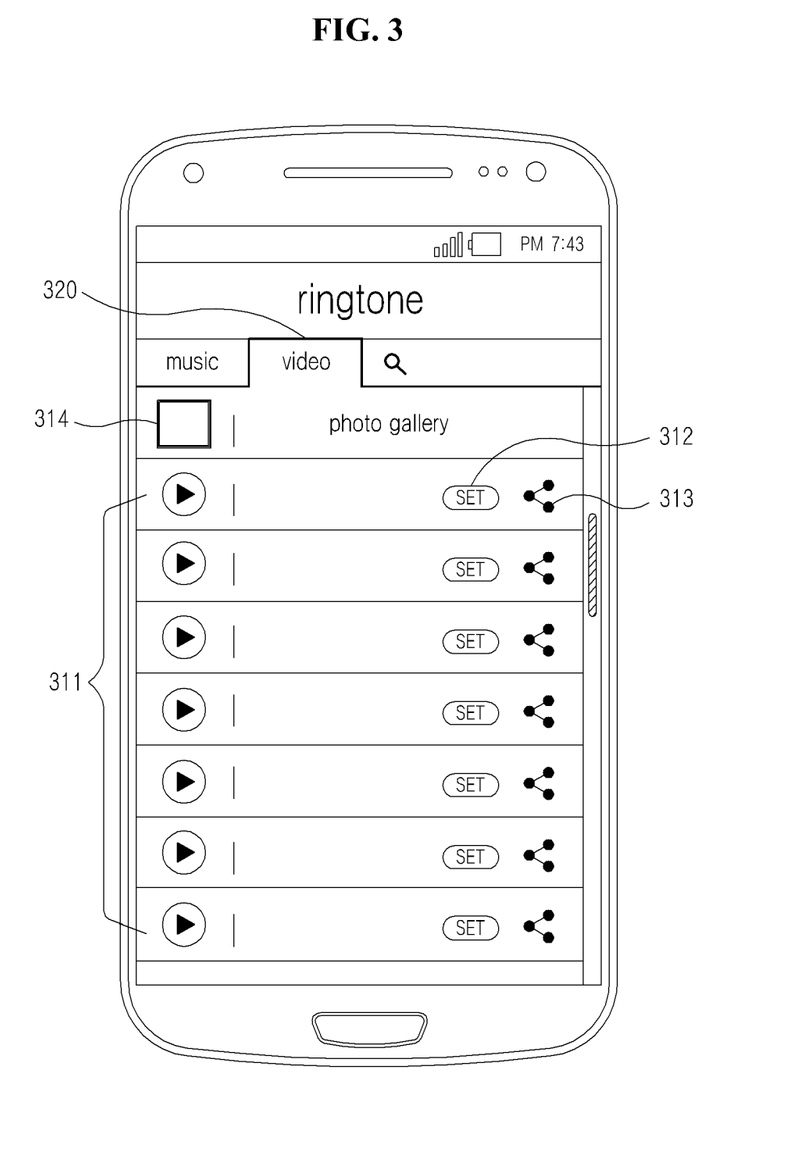
Figure 4:
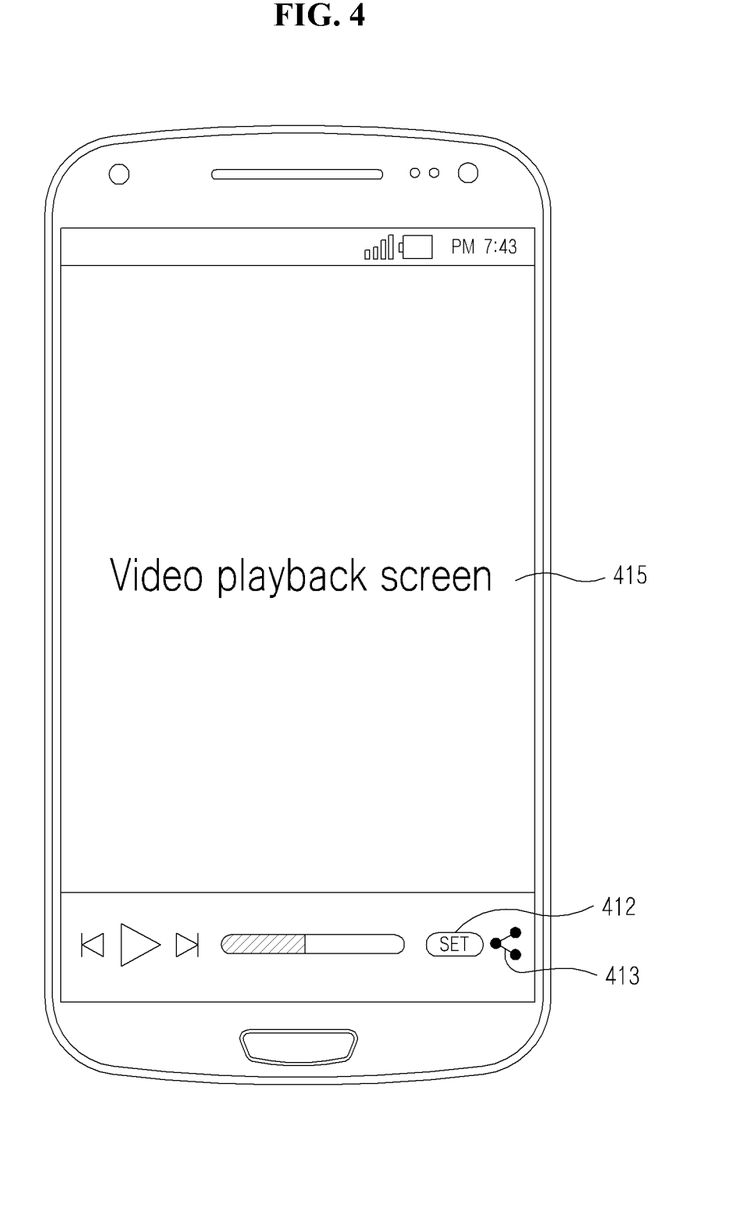

FIG. 3 illustrates an example of a user screen 320 for setting a media file of a ringtone according to an example embodiment. Referring to FIG. 3, all the videos settable as a media file are displayed as a list 311. The videos may include general video files and a video separated from a multimedia file. A "photo gallery" menu 314 for calling a list of videos stored in a local area of a user terminal may be further displayed. Here, a "set" menu 312 for setting each video included in the list 311 as a media file and a "share" menu 313 for sharing a video through a mail service, a messenger service, a social network service, a wireless transmission function, and a memo function may be activated and displayed. FIG. 4 illustrates an example of a video playback screen 415 on which a video selected from the list 311 of FIG. 3 or a video list of a photo gallery is being played back. A "set" menu 412 and a "share" menu 413 for a corresponding media file may be activated and displayed. Accordingly, a user may select a video desired to be set as a media file of a ringtone using the "set" menu 312 of the user screen 310 or the "set" menu 412 of the video playback screen 415.

Accordingly, the ringtone providing system sets, as a bell file of a ringtone, a sound source selected by a user, and as a media file of the ringtone, a silent video selected by the user, for example, a video in which the sound source is removed from a multimedia file.

Figure 5:
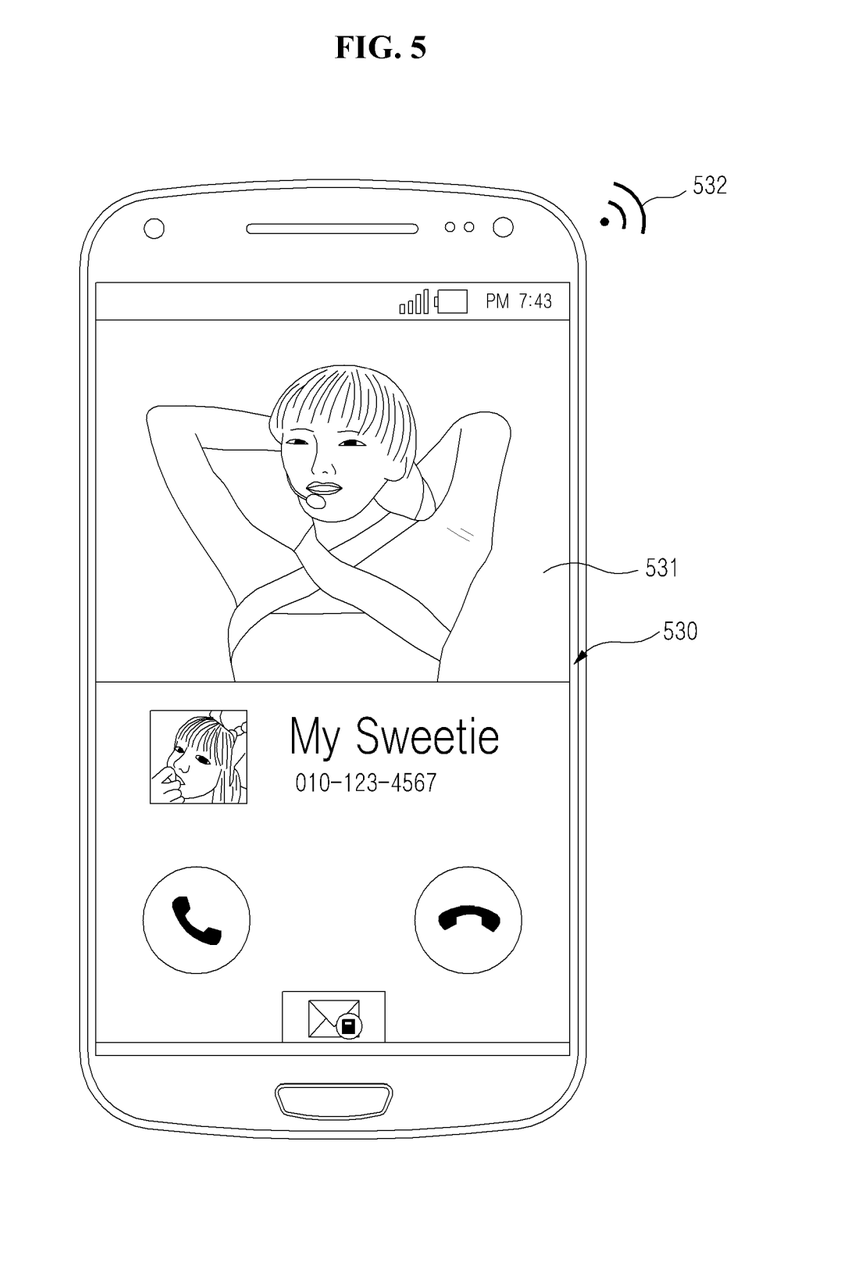
FIG. 5 illustrates an example of an incoming call screen to which a video multimedia ringtone is applied according to an example embodiment.

Referring again to FIG. 1, in operation S120, the ringtone providing system simultaneously plays back the media file and the bell file that are set as the ringtone, in response to an incoming call signal. FIG. 5 illustrates an example of an incoming call screen 530 of a user terminal. Referring to FIG. 5, a ringtone providing system provides a ringtone in a video multimedia format by playing back a silent video 531 set as a media file in response to a signal of a call received at a user terminal and at the same time, playing back a sound source 532 set as a bell file. By maintaining a bell file to be played back and, at the same time, playing back a video in which a sound source is removed, it is possible to prevent a sound source of the bell file and the sound source of the video from mixing, and to reduce the amount of memory used to play back a ringtone, compared to a method of processing an existing ringtone to be silent while still playing the existing ringtone together with the video multimedia.

Further, in response to a signal of a hardware control key, for example, a volume up (+) button and a volume down (−) button, associated with a volume during a playback of a ringtone, the ringtone providing system may control a playback volume level of a bell file being played back. According to an example embodiment, a ringtone may be provided by simultaneously playing back a silent video in which a sound source is removed and an individually set bell file. Thus, while receiving a call, the bell file may be a unique output sound source and also be a sound source controlled by a hardware control key. Accordingly, it is possible to prevent a malfunction in controlling a volume of a media sound source of a ringtone or a non-operation thereof.

In addition, a predetermined amount of time is required to play back a media file. Also, a play of the media file may be delayed due to other programs being played when the media file is played, and a collision with the other programs may be present. Thus, unless the media file is played back within a predetermined amount of time, for example, one second, the ringtone providing system may apply a method of preferentially playing back a bell file. Accordingly, it is possible to decrease an amount of time used to notify an incoming call or to receive a call, and to enhance a service continuity without harming an original function of a phone and a user need.

In operation S130, the ringtone providing system simultaneously terminates the media file and the bell file being played back to suspend the ringtone, when the user receives a call.

According to example embodiments, a ringtone providing method may configure a ringtone in a video multimedia format by maintaining a sound source and a video in which a sound source is removed.

Methods according to example embodiments may be configured in a form of program instructions to implement various operations embodied by a variety of computer systems and may be recorded in non-transitory computer-readable media. The methods include a program, including setting a silent video separated from a multimedia file, as a media file that is a video file of a ringtone, setting a selected sound source as a bell file that is a sound file of the ringtone, and simultaneously playing back the media file and the bell file that are set as the ringtone, in response to an incoming call signal.

The program according to example embodiments may be configured as a PC-based program or an application exclusive for a mobile terminal. An application (app) for controlling an input screen according to example embodiments may be configured in an independently operating program or an in-app form of a predetermined application, for example, a messenger program and thereby operable on the predetermined application.

Also, the ringtone providing method according to example embodiments may be performed in such a manner that an application associated with a server system configured to provide a ringtone related service controls a user terminal. For example, such application may include modules configured to control the user terminal to perform operations included in the ringtone providing method of FIG. 1. The application may be installed in the user terminal through a file provided from a file distribution system. For example, the file distribution system may include a file transmitter (not shown) configured to transmit the file in response to a request of the user terminal.

Figure 6:
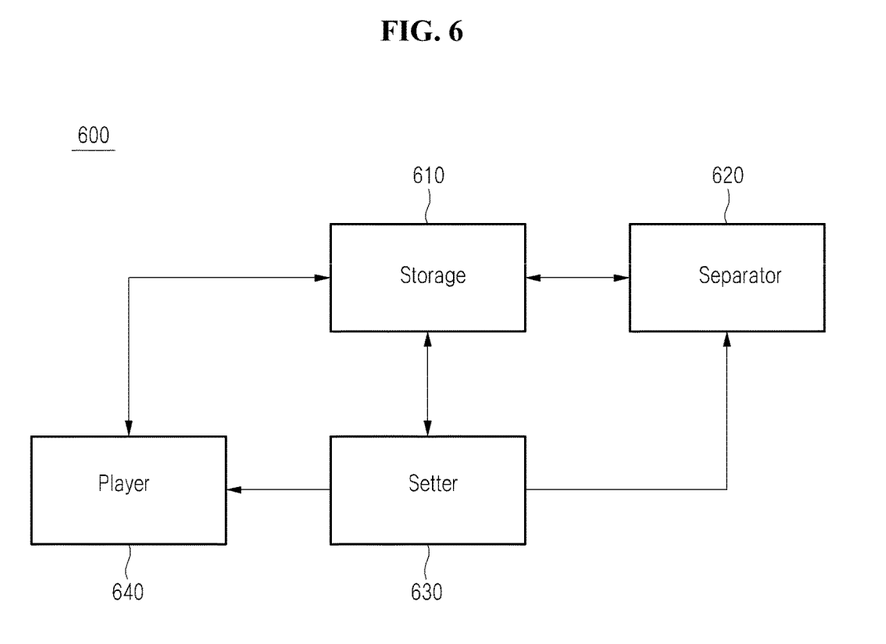
FIG. 6 is a block diagram illustrating an example of a ringtone providing system using video multimedia according to an example embodiment.

FIG. 6 is a block diagram illustrating an example of a ringtone providing system 600 using video multimedia.

Referring to FIG. 6, the ringtone providing system 600 includes a setter 630 and a player 640. The ringtone providing system 600 may further include a storage 610 and a separator 620. In the ringtone providing system 600, a portion of constituent elements may be omitted and additional constituent elements may be further included. Also, at least two constituent elements may be combined and an operation order or an association method between the constituent elements may be changed.

The storage 610 refers to a local storage space of a user terminal and may store a multimedia file. The storage 610 may also store a multimedia file that is separated into a sound source and a video. That is, when storing the multimedia file, the storage 610 may store the sound source separated from the multimedia file and the video separated from the multimedia file, that is, a silent video in which the sound source is removed.

The separator 620 serves to separate the multimedia file into the sound source and the video.

In the case of the multimedia file that is inseparable into a sound source and a video, the separator 620 may acquire, from the multimedia file, a silent video in which a sound source is removed.

The setter 630 sets the silent video separated from the multimedia file as a media file of a ringtone, and sets a selected sound source as a bell file of the ringtone. For example, the setter 630 may set, as a bell file, a sound source separated from the same multimedia applied to a media file, or may set, as the bell file, a sound source separately selected from the multimedia applied to the media file. The bell file is synchronized with the media file and thus, may refer to a sound source relevant to the media file, or may refer to a sound source irrelevant to the media file.

The player 640 synchronizes and thereby simultaneously plays back the media file and the bell file of the ringtone in response to an incoming call signal received at the user terminal. That is, in response to an incoming call received at the user terminal, the player 640 provides a ringtone in a video multimedia format by playing back the silent video set as the media file on an incoming call screen and at the same time, playing back the sound source set as the bell file. Here, unless the media file of the ringtone is played back within a predetermined amount of time, for example, one second, the player 640 may preferentially play back only the sound source set as the bell file. Also, in response to a signal of a hardware control key, for example, a volume up (+) button and a volume down (−) button, associated with a volume during playback of the ringtone, the player 640 may control a playback volume level of the bell file being played back. According to example embodiments, a ringtone may be provided by simultaneously playing back a silent video in which a sound source is removed and an individually set bell file. Thus, while receiving a call, the bell file may be a unique output sound source and also be a sound source controlled by a hardware control key. Accordingly, it is possible to control a media volume of the ringtone. When a user receives the call, the player 640 may simultaneously terminate the media file and the bell file being played back to suspend the ringtone.

According to the above configuration, the ringtone providing system 600 may provide a ringtone using video multimedia by maintaining the bell file as a ringtone and playing back a silent video in which a sound source is removed.

As described above, according to example embodiments, it is possible to expand an existing ringtone area limited to a music file to a multimedia file by employing video multimedia as a ringtone. Accordingly, it is possible to enhance a functional utilization and usage of a mobile phone by additionally applying advantages of a multimedia device to a primary call function of the mobile phone. Also, according to example embodiments, by separating video multimedia into a sound source and a video and by employing a silent video in which the sound source is removed as a media video for a ringtone, it is possible to effectively reduce sound source interference in which an undesired sound source is mixed when configuring a video as a ringtone, or to reduce a volume malfunction occurring due to an uncontrollable volume. Accordingly, it is possible to achieve a complete performance of a multimedia file.

The ringtone providing system 600 described herein may be implemented using hardware components, software components, or a combination thereof. For example, the ringtone providing system 600 may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner.

The software implementing the ringtone providing system 600 may include a computer program, a piece of code, an instruction, or some combination thereof, for independently or collectively instructing or configuring a processing or computing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

It will be apparent to those skilled in the art that various modifications and variation can be made in the example embodiments without departing from the spirit or scope of the invention. Thus, it is intended that the example embodiments cover the modifications and variations of this invention provided they come within the scope of the appended claims and their equivalents.

What is claimed is:

1. A method of generating a multimedia ringtone from a multimedia file in a mobile terminal of a type having a bell file which is played to activate an audible ringtone each time an incoming call signal is received on the mobile terminal, and a hardware control key operable to control a volume of the audible ringtone but inoperable to control a volume of a sound source of the multimedia file, during the receipt of the incoming call signal, the method comprising:
separating a silent video source from the multimedia file;
setting, by a processor, the silent video source separated from the multimedia file as a media file that is a video file of the multimedia ringtone to be played in response to an incoming call signal;
selecting a sound source from a plurality of sound sources;
setting, by the processor, the selected sound source as the bell file that is a sound file of the multimedia ringtone to be played in response to the incoming call signal; and
in response to the incoming call signal:
determining whether the media file is able to be played within a predetermined and fixed amount of time from receipt of the incoming call signal; and
simultaneously playing, by the processor, both the media file and the bell file to activate the multimedia ringtone if it is determined that the media file is able to be played within the predetermined and fixed amount of time,
wherein the sound source included in the multimedia file is not activated, and the control of the volume of the multimedia ringtone is operable by the hardware control key, during the receipt of the incoming call signal; and
wherein, in response to the incoming call signal, only the bell file is played when it is determined that the media file is unable to be played within the predetermined and fixed amount of time from receipt of the incoming call signal on the mobile terminal as a result of an interference from another program running on the mobile terminal.

2. The method of claim 1, wherein the selected sound source set as the bell file is the sound source separated from the multimedia file.

3. The method of claim 1, wherein the selected sound source set as the bell file is not the sound source separated from the multimedia file.

4. The method of claim 1, further comprising:
simultaneously terminating the media file and the bell file being played when a user receives a call on the mobile terminal.

5. A system for generating a ringtone from a multimedia file in a mobile terminal of a type having a bell file which is played to activate an audible ringtone each time an incoming call signal is received on the mobile terminal, and a hardware control key operable to control a volume of the audible ringtone but inoperable to control a volume of a sound source of the multimedia file, during the receipt of the incoming call signal, the system comprising:
a separator configured to separate a silent video source from the multimedia file;
a setter configured to set the silent video source separated from the multimedia file as a media file that is a video file of the multimedia ringtone to be played in response to an incoming call signal, to select a sound source from a plurality of sound sources, and to set the selected sound source as the bell file that is a sound file of the multimedia ringtone to be played in response to the incoming call signal; and
a player configured to, in response to the incoming call signal:
determine whether the media file is able to be played within a predetermined and fixed amount of time from receipt of the incoming call signal; and
simultaneously play both the media file and the bell file to activate the multimedia ringtone if it is determined that the media file is able to be played within the predetermined and fixed amount of time,
wherein the sound source included in the multimedia file is not activated, and the control of the volume of the multimedia ringtone is operable by the hardware control key, during the receipt of the incoming call signal, and
wherein, in response to the incoming call signal, only the bell file is played when it is determined that the media file is unable to be played within the predetermined and fixed amount of time from receipt of the incoming call signal on the mobile terminal as a result of an interference from another program running on the mobile terminal.

6. The ringtone providing system of claim 5, wherein the setter is configured to set, as the bell file, the sound source separated from the multimedia file.

7. The ringtone providing system of claim 5, wherein the selected sound source set as the bell file is not the sound source separated from the multimedia file.

8. The ringtone providing system of claim 5, wherein the player is configured to simultaneously terminate the media file and the bell file being played when a user receives a call on the mobile terminal.

9. Non-transitory computer-readable recording media storing instructions for generating a multimedia ringtone from a multimedia file in a mobile terminal of a type having a bell file which is played to activate an audible ringtone each time an incoming call signal is received on the mobile terminal, and a hardware control key operable to control a volume of the audible ringtone but inoperable to control a volume of a sound source of the multimedia file, during the receipt of the incoming call signal, wherein the instructions control a processor to execute the functions comprising:
   separating a silent video source from the multimedia file;
   setting the silent video source separated from the multimedia file as a media file that is a video file of the multimedia ringtone to be played in response to an incoming call signal;
   selecting a sound source from a plurality of sound sources;
   setting the selected sound source as the bell file that is a sound file of the multimedia ringtone to be played in response to the incoming call signal; and
   in response to the incoming call signal:
      determining whether the media file is able to be played within a predetermined and fixed amount of time from receipt of the incoming call signal; and
      simultaneously playing both the media file and the bell file to activate the multimedia ringtone if it is determined that the media file is able to be played within the predetermined and fixed amount of time,
   wherein the sound source included in the multimedia file is not activated, and the control of the volume of the multimedia ringtone is operable by the hardware control key, during the receipt of the incoming call signal, and
   wherein, in response to the incoming call signal, only the bell file is played when it is determined that the media file is unable to be played within the predetermined and fixed amount of time from receipt of the incoming call signal on the mobile terminal as a result of an interference from another program running on the mobile terminal.

10. The non-transitory computer-readable recording media of claim 9, wherein the selected sound source set as the bell file includes the sound source separated from the multimedia file.

11. The non-transitory computer-readable recording media of claim 9, wherein the selected sound source set as the bell file is not the sound source separated from the multimedia file.

12. The non-transitory computer-readable recording media of claim 9, wherein the instructions further control the processor to execute the function of:
   simultaneously terminating the media file and the bell file being played when a user receives a call on the mobile terminal.

13. A method of providing a ringtone from a multimedia file in a mobile terminal of a type having a multimedia player for playing video files and audio files, and a bell file played to activate the ringtone each time an incoming call signal is received on the mobile terminal, and a hardware control key operable to control a volume of the audible ringtone but inoperable to control a volume of a sound source of the multimedia file, during the receipt of the incoming call signal, the method comprising:
   separating a multimedia file into a sound source and a silent video;
   setting, by a processor, the silent video separated from the multimedia file as a media file that is a video file of the ringtone to be played in response to an incoming call signal;
   selecting a sound source from a plurality of sound sources including the sound source separated from the multimedia file;
   setting, by the processor, the selected sound source as the bell file that is a sound file of the ringtone to be played in response to the incoming call signal; and
   in response to the incoming call signal:
      determining whether the media file is able to be played within a predetermined and fixed amount of time from receipt of the incoming call signal; and
      simultaneously playing, by the processor, both the media file and the bell file to activate the ringtone if it is determined that the media file is able to be played within the predetermined and fixed amount of time;
   wherein the multimedia player plays the silent video separated from the multimedia file without playing the sound source which was separated from the multimedia file, and the control of the volume of the multimedia ringtone is operable by the hardware control key, during the receipt of the incoming call signal, and
   wherein, in response to the incoming call signal, only the bell file is played when it is determined that the media file is unable to be played within the predetermined and fixed amount of time from receipt of the incoming call signal on the mobile terminal as a result of an interference from another program running on the mobile terminal.

* * * * *